INVENTOR
Herbert Wilhelm Gustav OCKER

United States Patent Office 3,427,728
Patented Feb. 18, 1969

3,427,728
SCREW CONVEYOR WITH VENTING STACKS
Herbert Wilhelm Gustav Ocker, Leonberg, Germany, assignor to Werner & Pfleiderer, Stuttgart-Feuerbach, Baden-Wurttemberg, Germany, a corporation of Germany
Filed Jan. 17, 1967, Ser. No. 609,919
Claims priority, application Germany, Jan. 22, 1966, W 40,782
U.S. Cl. 34—183  6 Claims
Int. Cl. F26b *17/20*

ABSTRACT OF THE DISCLOSURE

A machine of the conveyor screw type for drying humid materials, comprising several conveyor screws or worms housed in a shared housing or casing which carry the material to be processed, in a thin continuous layer, to the discharge end through at least one degasification section; the casing comprises a plurality of venting stacks in sequence, separated from each other by partitions which are curved to correspond to a portion of the periphery of the corresponding adjacent screw, and are arranged at a predetermined distance from the said screw.

---

Figure 1:
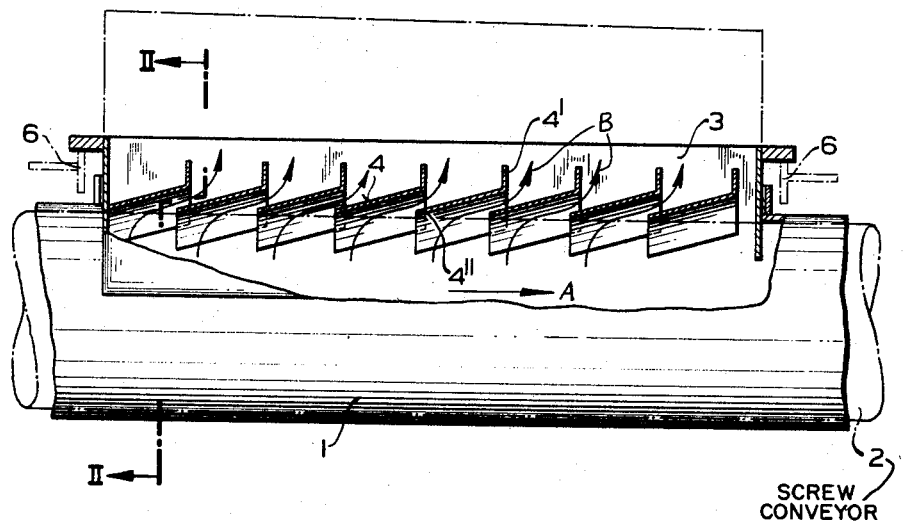

The present invention has as its object a machine of the conveyor screw type, for drying humid materials such as pastes and the like, comprising conveyor screws or worms situated in a shared casing, which carry the material which is to be processed, in continuous manner and in the form of a thin layer, to the discharge extremity of the machine, passing the material through at least one heating section.

In a known system for drying pastes, the pastes must be applied in thin layer form on corresponding carrying plates, such as so-called trays, and the trays must be arranged one above the other in drying kilns or the like. Plants of this nature must be charged and emptied by hand, which already represents a considerable expenditure on labor. This measure does not moreover ensure uniform drying on all trays, because the individual layers are not applied in uniform thickness. The total period required for a drying operation thus cannot represent a constant for a predetermined degree of desiccation. Plants of this nature are uneconomical in operation, for production of a homogenous product such as a powder for example.

The invention has as its fundamental problem to simplify the drying of humid materials, including the evaporation of solvents, diluents and such additives as may be employed to control viscousness, or analogous agents, such as employed in producing pastes, and simultaneously to ensure rapid and uniform drying. According to an essential feature of the invention, this is accomplished by virtue of the fact that the casing of the machine comprises several venting stacks or chimneys positioned consecutively in the longitudinal direction of the casing, which stacks are separated from each other by partitions, the undersides of the partitions facing towards the conveyor screws being curved according to a portion of the periphery of the adjacent screws or worms, and being situated at a predetermined distance from the same. The degasification space formed in the arrangement according to the invention, may contingently also represent a heating space in which rapid and reliable evacuation of the vapors and gases is assured. The partitions between the separate venting stacks may advantageously be positioned at an angle in the direction of travel of the material which is to be processed, such as to prevent any accumulation of the material conveyed at the undersides of the partitions. On the contrary, the arrangement according to the invention ensures that the material is stripped off the undersides of the partitions so that its conveying, that is to say its degasification or drying, may be continued.

Depending on the material to be processed in each case, individual partitions or all partitions of the venting stacks may have a section extending parallel to the longitudinal axis of the screw or worm at their extremity facing towards the screw. This section may then equally be of curved shape, corresponding to the diameters of the adjacent screws. Depending on the material to be processed, the distance between the partitions and the screws may be adjustable moreover. This adjustability is appropriately established by arranging the entire degasification space, that is to say the space encompassing all the venting stacks, in the form of a structural unit such that it may be coupled to the casing, in such manner that it may be raised or lowered in stepped or infinitely variable manner, by means of lifting elements such as cams or the like.

According to another feature of the invention, the effect of the individual venting stacks on the material which is to be processed may be varied by varying the distances separating the partitions in a uniform or non-uniform manner, for example such as to vary the venting effect by reducing the distance between the partitions towards the discharge extremity of the casing. The distance between the partitions may evidently increase towards the discharge extremity of the casing. Appropriate selection of the arrangement or spacing of the partitions will then be governed by the operating conditions specified, and will also depend on whether a vacuum is applied in the venting stacks or not, for drawing off the vapors or gases.

According to yet another feature of the invention, the sections of the individual partitions extending parallel to the longitudinal axis of the screws, have perforations of which the size and/or density may vary towards the discharge extremity of the casing. These sections may contingently be equipped with shutters or flaps, which may be arranged to cover or uncover the perforations wholly or partially.

As apparent from the preceding, extensive and manifold possibilities are available for adaptation to the material to be processed in each instance within the scope of the invention, without particular effort or expenditure.

Several venting stacks combined into a structural unit and appropriately arranged for heating or application of a vacuum, may evidently be arranged on a casing of this kind.

The invention will now be described with reference to the accompanying drawings, which show embodiments of the invention, but in no restrictive sense.

Figure 2:
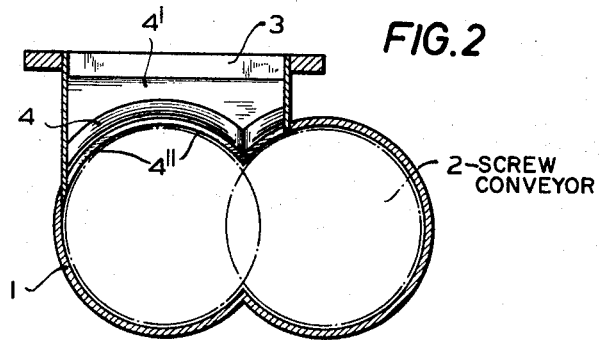
Figure 3:
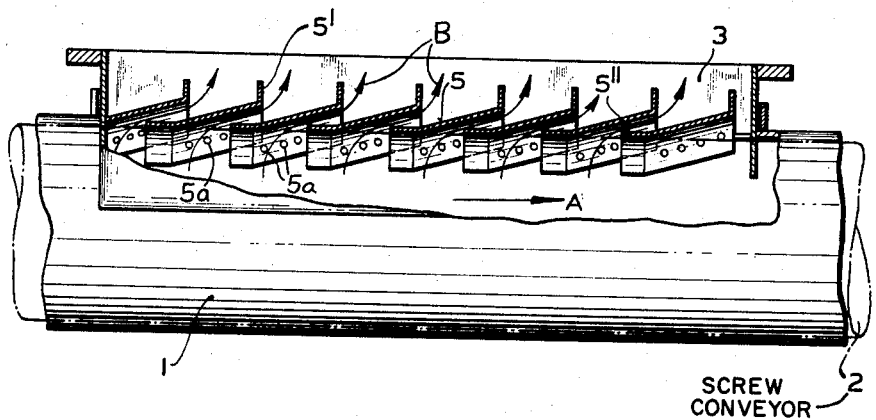

FIGURE 1 represents a simplified form of illustration of a machine of the conveyor screw type comprising venting stacks, shown in partial section, FIGURE 2 illustrates a section taken along the line II—II, and FIGURE 3 is an illustration analogous to FIGURE 1, showing a modified form of construction of the venting stacks.

As apparent from FIGURE 2, two conveyor screws 2 drawn in dash-dotted lines are arranged for rotation within a casing 1, the screws being intermeshing and operating in self-cleaning manner. The screws or worms 2 may be hollow, so that they may be heated. This measure may be applied to all parts of the said casing, which may thus comprise appropriate bores or passages for traversal by a conditioned fluid. These details are not illustrated in the accompanying drawings.

As apparent from FIGURE 1, the casing 1 has a perforation or opening into which a frame 3 is inserted, and which forms a degasification or venting space for the product to be processed. The frame 3 internally comprises partitions 4, 4' which may be arranged to overlap in the manner of scales, the partitions 4 being positioned at an angle to the conveying direction (arrow A, FIGS. 1 and 3) of the screws 2 and comprising substantially vertical portions 4'. The undersides 4" of the partitions 4 are curved to correspond to a portion of the periphery of the adjacent screws, as apparent from FIGURE 2 in particular. The vented gases flow in accordance with arrows B (FIGS. 1 and 3).

According to a feature of the invention, the partitions may be of different width. In the form of embodiment illustrated by way of example, the partitions cover both said screws. The arrangement may evidently be such moreover that equal portions of the two screws are covered by the partitions 4.

In the arrangement illustrated in FIGURE 3, the partitions 5, 5', 5" equally have their median portion 5 positioned at an angle to the conveying direction of the screw, the underside of the portion being followed by a part 5" extending substantially parallel to the longitudinal axis of the screw and curved to correspond to a portion of the periphery of the adjacent screws. The upper part 5' of the partitions, which may be employed for fastening purposes, is equally positioned in substantially vertical direction, as in the arrangement according to FIGURE 1.

The lower parts 5" may equally be of different size, and may moreover have one or more perforations 5a. The parts 5" may moreover comprise shutters or the like, which may be arranged for partial or total covering or uncovering the perforation or perforations, the latter not being shown in the drawings.

The partitions of the separate venting stacks may evidently be made of different materials.

In the arrangement according to FIGURE 1, as well as in that of FIGURE 2, it is possible to move the entire frame 3 at right angles to the longitudinal direction of the screws, by means of lifting cams 6 for example, in order to vary the distance between the undersides of the partitions 4 or 5 and the screws.

The invention is evidently not limited to the forms of embodiment described in the foregoing and illustrated in the accompanying drawings, and the construction and arrangement of the partitions in particular, may be modified in many ways. All the partitions could thus be arranged in displaceable manner so that their angle relative to the longitudinal axis of the screws may be adjusted. The distances between the partitions 4 or 5 may equally be adjustable for adaptation to the material to be processed or to specific operating conditions.

I claim:
1. A machine of the conveyor screw type, for drying humid materials such as pastes and the like, comprising conveyor screws or worms positioned in a common casing, which screws are adapted to pass material to be processed through said casing in continuous manner and in the form of a thin layer, and through at least one degasification space in the casing, in which there are several partitions positioned one behind the other in the longitudinal direction and defining degasification or venting stacks therebetween, said partitions having curved surfaces extending longitudinally of the casing and facing towards said conveyor screws.

2. A machine as claimed in claim 1, in which said curved surfaces are inclined upwardly in the direction of travel of the material which is to be processed.

3. A machine as claimed in claim 1, in which at least one partition has at the end of said curved surface adjacent said conveyor screws a section extending parallel to the longitudinal axis of said screws.

4. A machine as claimed in claim 1, including means for varying the distance between said partitions and said screws.

5. A machine as claimed in claim 1, in which the partitions are structurally joined into a single unit capable of removal from the casing.

6. A machine as claimed in claim 3, in which said section extending parallel to the longitudinal axis of said screws have perforations therein.

References Cited

UNITED STATES PATENTS

| | | | |
|---|---|---|---|
| 192,069 | 6/1877 | Higbie | 34—183 |
| 676,165 | 6/1901 | Wacker | 34—182 |
| 1,773,202 | 8/1930 | Rosenfield | 34—183 XR |
| 2,452,249 | 10/1948 | Leiske | 34—183 |
| 3,118,744 | 1/1964 | Erdmenger et al. | 34—183 |

JULIUS E. WEST, *Primary Examiner.*

A. D. HERRMANN, *Assistant Examiner.*